United States Patent [19]

Becquerel

[11] Patent Number: 5,111,738

[45] Date of Patent: May 12, 1992

[54] AIR BLOWER UNIT FOR A MOTOR VEHICLE HEATING AND VENTILATING SYSTEM

[75] Inventor: Michel Becquerel, Le Mesnil-Saint-Denis, France

[73] Assignee: Valeo Thermique Habitacle, Le Mesnil-Saint-Denix, France

[21] Appl. No.: 726,885

[22] Filed: Jul. 8, 1991

[30] Foreign Application Priority Data

Jul. 11, 1990 [FR] France ................................ 90 08849

[51] Int. Cl.⁵ .............................................. B60H 1/24
[52] U.S. Cl. .................. 454/159; 415/214.1; 454/140
[58] Field of Search .................... 98/2, 2.05, 2.08; 415/206, 214.1

[56] References Cited

U.S. PATENT DOCUMENTS

| | | | |
|---|---|---|---|
| 1,767,279 | 6/1930 | Bulkeley | 415/214.1 |
| 2,710,573 | 6/1955 | Marker | 415/206 X |
| 3,619,080 | 11/1971 | Bullock | 415/206 |
| 3,950,835 | 4/1976 | Bennink et al. | 415/206 X |
| 4,599,042 | 7/1986 | Colliver | 415/214.1 X |

FOREIGN PATENT DOCUMENTS

| | | | |
|---|---|---|---|
| 2123289 | 12/1971 | Fed. Rep. of Germany | 415/206 |
| 2315571 | 10/1974 | Fed. Rep. of Germany | |
| 138238 | 9/1979 | Japan | |
| 306914 | 12/1988 | Japan | |

Primary Examiner—Harold Joyce
Attorney, Agent, or Firm—Longacre & White

[57] ABSTRACT

The air blower unit includes a casing having a lower wall, and upper wall and two opposed side walls, which together define two open and opposed end faces of the same profile. The casing also includes a mounting frame, together with an air blower which is mounted within the casing and which comprises a blower rotor, a drive motor for the blower rotor, and two symmetrical half shells which are mated together to define a volute chamber in which the blower rotor and the motor are mounted.

This unit is readily adaptable to two different configurations, according to whether the vehicle in which it is to be installed is of the left hand drive or right hand drive type.

11 Claims, 2 Drawing Sheets

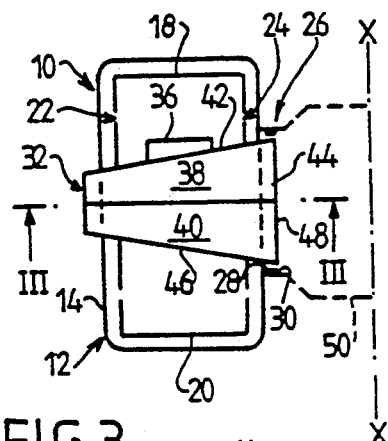
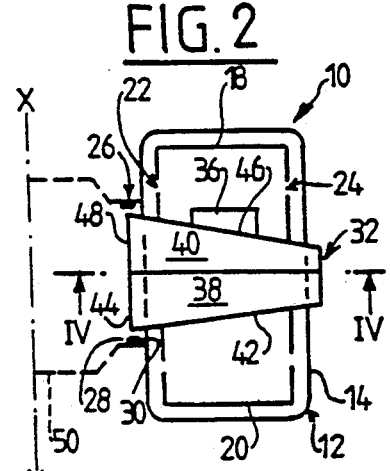
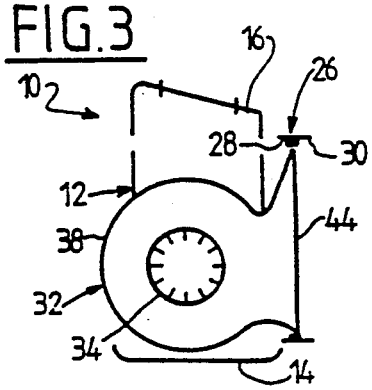
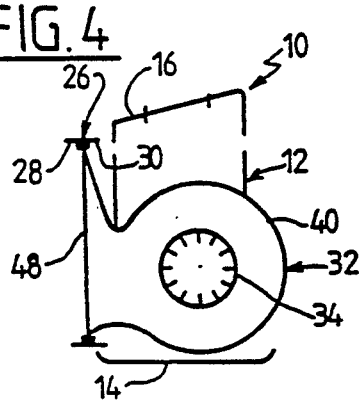
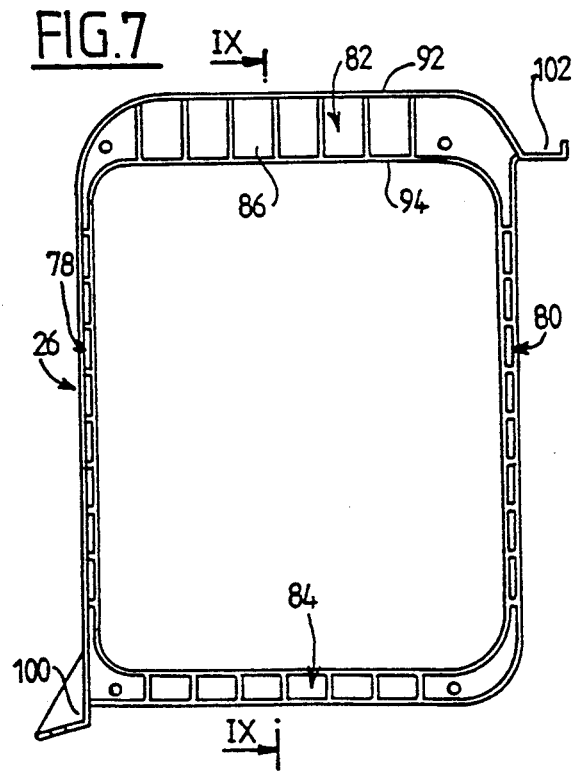
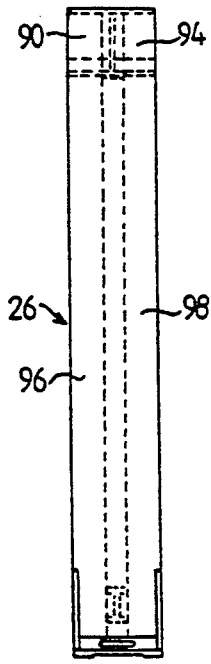
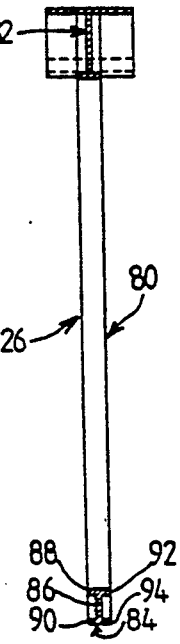

AIR BLOWER UNIT FOR A MOTOR VEHICLE HEATING AND VENTILATING SYSTEM

FIELD OF THE INVENTION

This invention relates to an air blower unit for a heating and ventilating system for a motor vehicle.

BACKGROUND OF THE INVENTION

Systems of this type include an air blower which is arranged to take air from outside the vehicle or air recycled within the vehicle, and to deliver air to a distribution casing which includes air reheating means and distribution vents, so as to distribute the air delivered under pressure, and optionally heated, into the cabin of the vehicle. The blower includes a chamber in the form of a volute, in which a blower rotor, driven by an electric motor, is mounted. The volute has an air inlet for admitting air from outside the vehicle or recycled air, together with an air outlet for the air delivered under pressure by the blower. This air outlet is connected to the distribution casing through an appropriate duct which may have an evaporator mounted within it if the installation is also an air conditioning system. One installation of this type is known, in particular, from the specification of Japanese patent application No. 54-138238.

Mass produced vehicles are arranged to be provided with either right hand drive, that is to say with the driver sitting on the right of the vehicle, or with left hand drive, that is to say with the driver sitting on the left hand side, as required. For reasons connected with the layout under the hood of the vehicle, it is generally necessary to provide that the blower is arranged on the opposite side of the vehicle from the driver, that is to say on the right hand side if the vehicle is of left hand drive, and vice versa. This has hitherto made it necessary to provide blower units which are specifically adapted according to whether the vehicle is of the left hand drive or right hand drive type. In practice this means that two types of blower unit must currently be provided, these being substantially identical except that they are "mirror images" of each other.

DISCUSSION OF THE INVENTION

A main object of the invention is to overcome this drawback by providing an air blower unit which can be used regardless of which side of the vehicle the driver's position is located.

To this end, the invention provides an air blower unit for a motor vehicle heating and ventilating system, characterized in that it includes:

an air blower adapted to be mounted in a casing and comprising a blower rotor, a motor for driving the rotor, and two half shells, which are generally symmetrical with each other and which are arranged to be mated together so as to define a volute containing the blower rotor and the motor, each half shell having a central opening and a lateral half opening, in such a way that one of the central openings serves as an air inlet and the other as a motor support, while the two lateral half openings together define an air outlet; and a casing having a lower wall, an upper wall and two opposed side walls, adapted so as together to define two open and opposed end faces of the same profile, the casing further including a mounting frame having two mounting sides, opposed to each other and symmetrical about a plane, in such a way that the mounting frame is able to cooperate with the air outlet of the air blower on either one of its mounting sides, which enables two casing configurations to be obtained in which the mounting frame retains the same spatial orientation with respect to the casing.

In this way, using identical components, it is possible to construct an air blower unit which can be arranged in two generally symmetrical configurations so that it may be adapted at will for either a right hand drive vehicle or a left hand drive vehicle.

According to a preferred feature of the invention, the two said half shells can be used in either one of the two configurations of the casing by changing their orientation through 180°, so as to convert from one configuration to the other, and the said opening of the half shell which serves as an air inlet in one of the two configurations of the casing serves to support the motor in the other configuration, and vice versa. In this way, in both configurations, the air inlet of the volute and the motor support retain their spatial orientation with respect to the casing.

In accordance with another preferred feature of the invention, the mounting frame includes a web, from which two peripheral lips, spaced from each other, depend on each of its said mounting sides.

In accordance with a further preferred feature of the invention, each half shell includes a wall portion which is disposed on the side opposite from the lateral half opening, in such a way that when the two half shells are mated together, the two said wall portions together define a wall which is joined to the lower wall, to the upper wall, and to the two side walls of the casing.

According to yet another preferred feature of the invention, one of the two side walls of the casing includes an air inlet for the admission of recycled air, while the base wall has at least one air inlet for the admission of recycled air.

Preferably, the upper wall of the casing includes at least one air inlet for the admission of air from outside the vehicle. This upper wall may be provided in two different versions corresponding respectively to the two configurations of the casing, i.e. for left hand drive or right hand drive.

Preferred embodiments of the invention will now be described, by way of example only and with reference to the accompanying drawings.

BRIEF DESCRIPTION OF THE DRAWINGS

FIG. 1 is a diagrammatic top plan view of an air blower unit in accordance with the invention, shown in a configuration corresponding to right hand drive.

FIG. 2 is a diagrammatic top plan view of the same unit, but in another configuration corresponding to left hand drive.

FIG. 3 is a diagrammatic cross sectional view taken on the line III—III in FIG. 1.

FIG. 4 is a diagrammatic cross sectional view taken on the line IV—IV in FIG. 2.

FIG. 7 is a view in elevation showing the mounting frame of the unit shown in FIGS. 5 and 6.

FIG. 8 is a side view of the mounting frame seen in FIG. 7.

FIG. 9 is a view in cross section taken on the line IX—IX in FIG. 7.

DESCRIPTION OF A PREFERRED EMBODIMENT OF THE INVENTION

Figure 5:
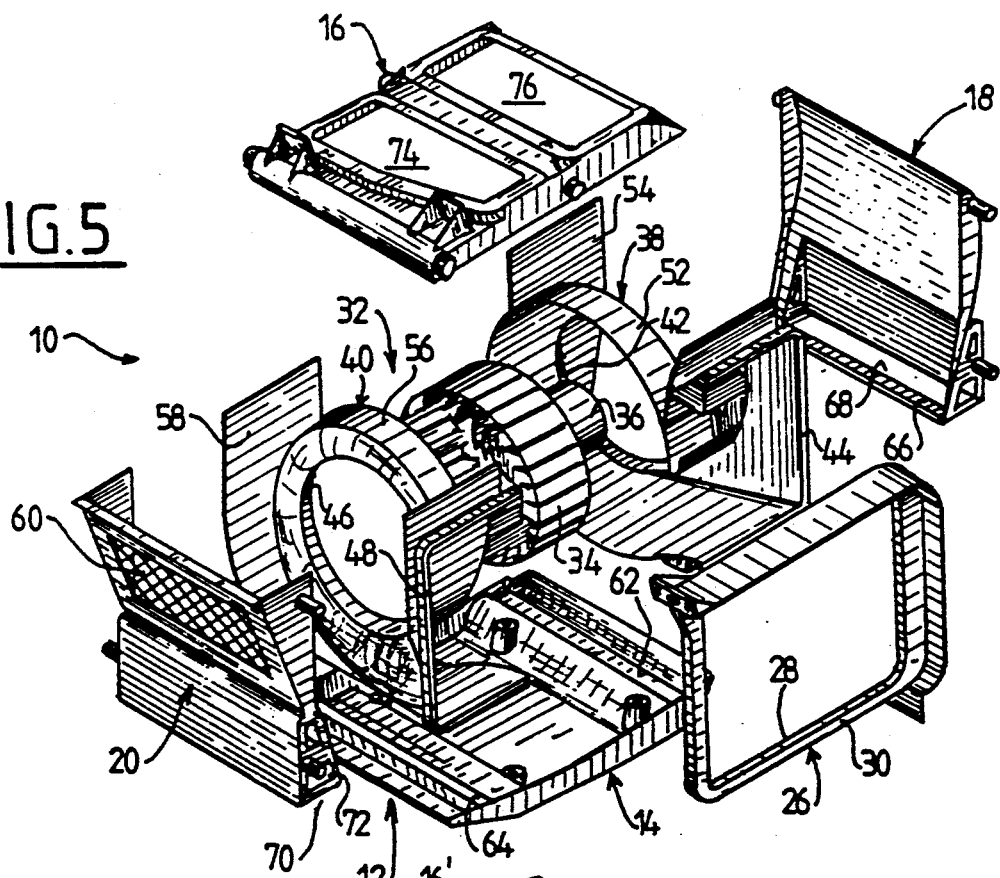
FIG. 5 is an exploded perspective view of an air blower unit in accordance with the invention, in a configuration corresponding to right hand drive.

Reference will first be made to FIG. 1, which shows one air blower unit 10 in accordance with the invention, arranged to be mounted on the left hand side of a vehicle having a longitudinal axis XX, the vehicle being of the right hand drive type.

With reference to FIGS. 1 and 3, the blower unit 10 includes a casing 12 which has a lower wall 14, an upper wall 16 and two opposed side walls 18 and 20. The walls 14, 16, 18 and 20 together define two end faces 22 and 24, which are open and opposite to each other and which have the same profile. In this example this profile is generally rectangular. The casing 12 also includes a mounting frame 26 having two mounting sides 28 and 30, opposed to each other and symmetrical about the general plane of the frame 26.

The blower unit 10 also includes an air blower 32, which is mounted inside the casing and which comprises a blower rotor 34 driven by a motor 36. The blower rotor and its motor are mounted inside two half shells 38 and 40, which are symmetrical in shape with each other and which are designed so that they are mated together to define a blower chamber in the form of a volute. The half shell 38 has a central opening 42 and a lateral half opening 44. Similarly, the half shell 40 has a central opening 46 and a lateral half opening 48. In the arrangement shown in FIGS. 1 and 3, the central opening 42 serves to support the motor 36, while the opening 46 serves as an air inlet, whereas in the arrangement seen in FIGS. 2 and 4, it is the opening 42 that acts as an air inlet while the opening 46 supports the motor 36.

In both the left hand drive and right hand drive configurations, the two half openings 44 and 48 are joined together to define an air outlet, the generally rectangular shape of which is such that it abuts snugly against the mounting frame 26. For this purpose, the mounting frame 26 is of substantially the same profile as both of the two half openings 44 and 48 when the latter are joined together, so that it is able to be adapted to these half openings on either one of its two mounting sides. It is in this way that the two alternative configurations of the housing are obtained.

In the configuration seen in FIG. 1, the mounting frame 26 is matched to the air outlet defined by the half openings 44 and 48 through its mounting side 28; while in the configuration seen in FIG. 2, it is matched to the air outlet through its mounting side 30. Consequently, it will be noted that in order to convert from the configuration of FIG. 1 to that of FIG. 2, the walls 14, 16, 18 and 20 are not changed, while the mounting frame 26 is simply turned round, its spatial orientation with respect to the casing 12 being retained.

However, in order to convert the casing from one of its configurations to the other, the two half shells 38 and 40 must be rotated through 180°. The respective functions of the two half shells 38 and 40 are thus reversed, since the opening in which the motor 36 was supported in one configuration becomes the air inlet in the other configuration, and vice versa. This enables the same general orientation to be preserved at all times, given that in both configurations the motor 36 is always on the same side of the casing as its wall 18, and the air inlet is always on the same side as the wall 20. The mounting side of the mounting frame 26 that faces outwardly from the casing (i.e. the side 30 in FIG. 1 and the side 28 in FIG. 2) is adapted to enable the unit 10 to be connected to a delivery duct 50, which is indicated diagrammatically in broken lines.

Figure 6:
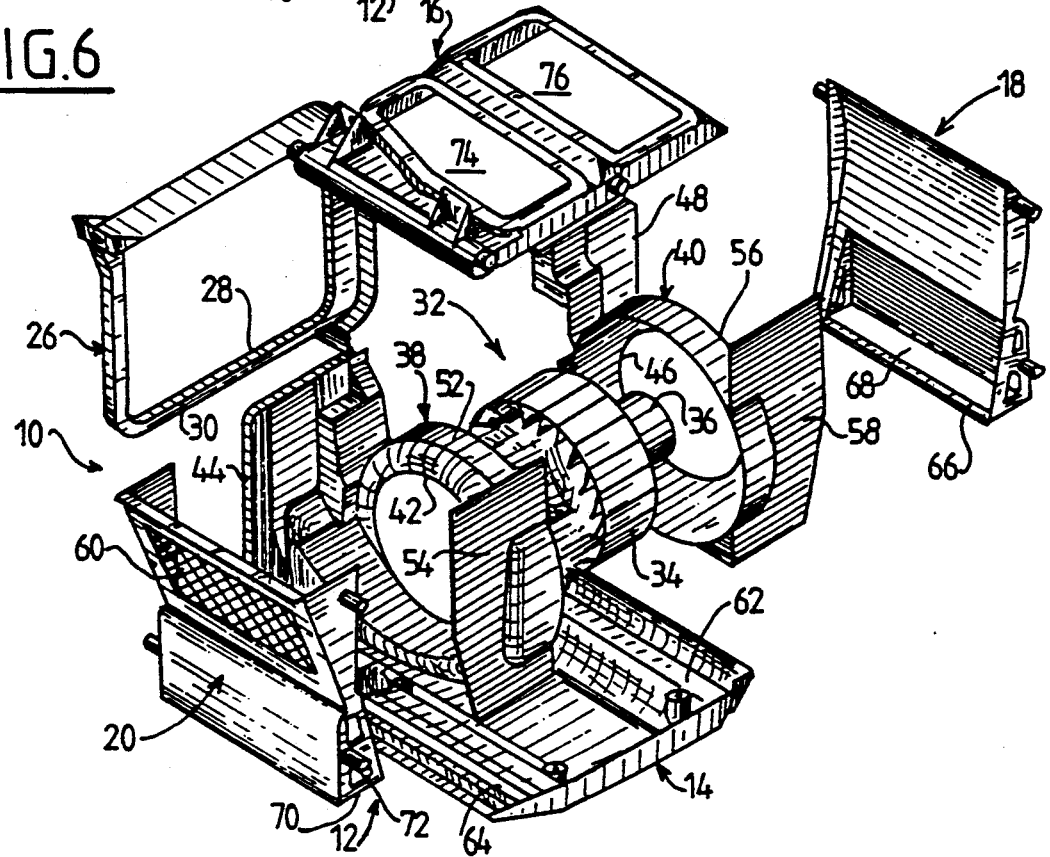
FIG. 6 is an exploded perspective view of the blower unit shown in FIG. 5, but in another configuration corresponding to left hand drive.

Reference is now made to FIGS. 5 and 6, which show an air blower unit 10 in two different configurations corresponding, respectively, to those of FIGS. 1 and 2. Those components of the unit that are indicated by reference numerals in FIGS. 1 to 4 are indicated by the same reference numerals in FIGS. 5 and 6.

As can be seen in FIGS. 5 and 6, each of the two half shells 38 and 40 comprises a single member, preferably made by molding in a plastics material. The half shell 38 includes a semi-volute portion 52 which defines the opening 42. The half opening 44 is arranged on one side of the semi-volute portion 52, while a wall portion 54 is arranged on its opposite side. In the same way, the half shell 40 comprises a semi-volute portion 56 which defines the opening 46, with the half opening 48 being arranged on one side of the semi-volute portion 56 and a wall portion 58 on the opposite side of the latter. When the two half shells 38 and 40 are mated together, the wall portions 54 and 58 together form a wall which is joined to all of the lower wall 14, the upper wall 16 and the side walls 18 and 20. These different walls are arranged to be joined together in any appropriate way, in order thus to constitute a sealed casing in which the air blower 32 is located after the half shells 38 and 40 have been assembled with the blower rotor 34 and its motor 36.

As is shown in FIGS. 5 and 6, the side wall 20 includes an air inlet 60 for admission of recycled air. The base wall 14 has two air inlets 62 and 64, both of elongated shape, and again for the admission of recycled air. A flange 66, formed in the lower part of the wall 18, has an elongated aperture 68 which corresponds to the opening 62 in the base wall 14. The aperture 68 and the opening 62 are brought together when the walls 14 and 18 are assembled together. In the same way, a flange 70 is formed in the lower part of the wall 20, and the flange 70 has an elongated aperture 78 which corresponds with the opening 64 of the base wall 14, the aperture 72 and the opening 64 being brought together as the walls 20 and 14 are assembled together.

The upper wall 16 has two air inlets 74 and 76 for admitting air from outside the vehicle. The air which thus enters the casing 12, through the air inlets 60, 62, 64, 74 and 76, is drawn in by the blower 32, so as to be delivered via the air outlet defined by the two half openings 44 and 48 together. This air is then delivered via the duct 50 to the ventilating air distribution system (not shown) of the vehicle.

Although in some cases the upper wall 16 can be used in both the left hand drive and right hand drive configurations, it is preferred, in accordance with FIGS. 5 and 6, to provide two components of generally symmetrical form, namely a wall 16 in the case of FIG. 5 and a wall 16' in the case of FIG. 6.

The structure of the mounting frame 26 will now be described in greater detail with reference to FIGS. 7 to 9. The general shape of the frame 26 is rectangular, being defined by two longitudinal bars 78 and 80, joined together through two transverse bars 82 and 84. The frame 26 includes a flat web, from which two peripheral lips 88 and 90 depend on the mounting side 28. The lips 88 and 90 are spaced from each other. On the mounting side 30, two further peripheral lips 92 and 94, again spaced from each other, depend from the flat web 86. The lips 92 and 94 are arranged in symmetrical correspondence with the lips 88 and 90. The lips 88 and 92 are situated inwardly of the lips 90 and 94. All of these lips are of substantially the same depth. However, the lips 90 and 94 comprise, respectively, portions of greater depth (indicated at 96 and 98) over half their periphery, so as to join two fastening lugs 100 and 102 which are situated at the ends of one diagonal of the rectangle.

The mounting frame 26 thus has a generally symmetrical form with respect to the plane defined by the web 86, so that it can be used equally well in either of the two configurations seen in FIGS. 5 and 6. In the configuration of FIG. 5, the mounting side 28 cooperates with the casing and the mounting side 30 with the duct 50, while in the configuration of FIG. 6 the opposite applies.

All the components of the air blower unit, apart from the motor, may be made by molding in plastics material, to be subsequently assembled together in any appropriate way.

What is claimed is:

1. An air blower unit for a heating and ventilating system of a motor vehicle, comprising a casing and an air blower mounted in the casing, the air blower comprising two generally symmetrical half shells mated together to define a volute chamber, a motor within the volute chamber, and a blower rotor coupled with the motor so as to be driven thereby, each half shell having a central opening and a lateral half opening, such that one of the central openings serves as an air inlet and the other to support the motor, while the two said lateral half openings together define an air outlet, said casing comprising an upper wall, a lower wall, and two opposed side walls together defining two open and opposed end faces having the same profile, the casing further including a mounting frame defining a datum plane and two opposed mounting sides which are symmetrical about said datum plane, so that the mounting frame can be fitted over the air outlet of the air blower on either one of its two said mounting sides indiscriminately, whereby to obtain two casing configurations in which the mounting frame retains the same spatial orientation with respect to the casing.

2. An air blower unit according to claim 1, whereby the two said half shells are so arranged that they are able to be used in either one of the two configurations of the casing by changing their orientation through 180°20 so as to convert from one configuration to the other, said central openings in the half shells being adapted so that the opening which serves as an air inlet in one of the configurations serves to support the motor in the other configuration, and vice versa.

3. An air blower unit according to claim 1, wherein the mounting frame further includes a web and two pairs of peripheral lips, with each pair of lips being arranged on one of said mounting sides of the mounting frame, the lips of each pair being spaced from each other.

4. An air blower unit according to claim 1, wherein the mounting frame comprises two longitudinal bars and two transverse bars joining the two longitudinal bars together, whereby the frame has a generally rectangular form.

5. An air blower unit according to claim 4, wherein the generally rectangular shape of the mounting frame defines a diagonal, and the mounting frame further including two mounting lugs arranged substantially at the respective ends of said diagonal.

6. An air blower unit according to claim 1, wherein each said half shell further includes a wall portion arranged on the side of the half shell opposite to said lateral half opening, whereby when the two half shells are mated together, the two said wall portions together define a wall joined to the lower wall, to the upper wall, and to the two side walls of the casing.

7. An air blower unit according to claim 1, wherein one of the two side walls of the casing defines an air inlet for the admission of recycled air.

8. An air blower unit according to claim 1, wherein the lower wall of the casing defines at least one air inlet for the admission of recycled air.

9. An air blower unit according to claim 1, wherein the upper wall of the casing defines at least one air inlet for the admission of fresh air from outside the vehicle.

10. An air blower unit according to claim 9, including said upper wall for the casing in two different versions corresponding respectively to the two configurations of the casing.

11. An air blower unit according to claim 2, wherein each said half shell further includes a wall portion arranged on the side of the half shell opposite to said lateral half opening, whereby when the two half shells are mated together, the two said wall portions together define a wall joined to the lower wall, to the upper wall, and to the two side walls of the casing.

* * * * *